United States Patent
Lavoignat (10) Patent No.: US 12,248,775 B2
(45) Date of Patent: Mar. 11, 2025

(54) SYSTEM TO IDENTIFY AND CHARACTERIZE CODE CHANGES

(71) Applicant: SAP SE, Walldorf (DE)

(72) Inventor: Sebastien Lavoignat, Droue-sur-Drouette (FR)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 17/724,230

(22) Filed: Apr. 19, 2022

(65) Prior Publication Data

US 2023/0333836 A1    Oct. 19, 2023

(51) Int. Cl.
*G06F 8/65* (2018.01)
*G06F 8/71* (2018.01)

(52) U.S. Cl.
CPC .... *G06F 8/65* (2013.01); *G06F 8/71* (2013.01)

(58) Field of Classification Search
CPC ..................................... G06F 8/65; G06F 8/71
See application file for complete search history.

(56) References Cited

U.S. PATENT DOCUMENTS

| 10,387,171 | B2* | 8/2019 | Hazarika | G06F 9/541 |
| 10,903,988 | B1 | 1/2021 | Belmar et al. | |
| 2012/0304148 | A1 | 11/2012 | Braun et al. | |
| 2014/0180961 | A1* | 6/2014 | Hankins | G06F 11/368 |
| | | | | 705/348 |
| 2015/0169320 | A1* | 6/2015 | Ahmed | G06F 8/71 |
| | | | | 717/122 |
| 2016/0092211 | A1* | 3/2016 | Atanasiu | G06F 8/73 |
| | | | | 717/113 |
| 2016/0274870 | A1* | 9/2016 | Seidman | G06F 8/35 |

(Continued)

FOREIGN PATENT DOCUMENTS

| JP | H09-62498 A | 3/1997 |
| JP | 2003-280903 A | 10/2003 |

(Continued)

OTHER PUBLICATIONS

Communication: "Extended European Search Report", Sep. 19, 2023 (Sep. 19, 2023), European Patent Office, for European Application No. 22208757.9-1203, 9 pages.

(Continued)

*Primary Examiner* — Wei Y Zhen
*Assistant Examiner* — Brahim Bourzik
(74) *Attorney, Agent, or Firm* — Buckley, Maschoff & Talwalkar LLC (57) ABSTRACT

Systems and methods include determination of a first code artifact and a second code artifact, generation of a first plurality of key, value pairs based on the first code artifact and a second plurality of key, value pairs based on the second code artifact, identification of a plurality of changes between the first plurality of key, value pairs and the second plurality of key, value pairs, the plurality of changes represented by a third plurality of key, value pairs; determination, for each of a plurality of rules, of whether the third plurality of key, value pairs includes at least one key, value pair associated with the rule and, if so, application of the rule to each of the at least one key, value pairs to determine an analysis output associated with each of the at least one key, value pairs, and generation of a visualization based on the analysis outputs.

20 Claims, 10 Drawing Sheets

(56) References Cited

U.S. PATENT DOCUMENTS

| | | | | |
|---|---|---|---|---|
| 2016/0274907 A1* | 9/2016 | Narayanan | ............... | G06F 8/71 |
| 2016/0283350 A1* | 9/2016 | Akbulut | .................... | G06F 8/71 |
| 2017/0052766 A1* | 2/2017 | Garipov | ................... | G06F 8/34 |
| 2020/0257700 A1* | 8/2020 | Xu | ............................ | G06F 8/65 |
| 2020/0264860 A1* | 8/2020 | Srinivasan | ............... | G06F 8/65 |
| 2021/0064723 A1* | 3/2021 | Drake | .................. | G06F 21/125 |

FOREIGN PATENT DOCUMENTS

| | | |
|---|---|---|
| JP | 2013-257639 A | 12/2013 |
| JP | 2015-075872 A | 4/2015 |
| JP | 2016-164727 A | 9/2016 |

OTHER PUBLICATIONS

"First Japanese Non-Final Office Action", dated Dec. 16, 2024 (Dec. 16, 2024), for Japanese Application No. 2022-199441, 6pgs.

\* cited by examiner

```
"name": "Application",
"description": "Collection of functions",
"type": "module",
"header": {
    "activities": {
        "newInstance": {
            "name": "Open Instance",
            "async": false,
            "inputs": {
            {
                "identifier": "visible"
                "default": "true"
                "optional": "true"
                "type": "simple"
            },
            "closeInstance": {
                "name": "Close Instance",
                "async": false,
                "inputs": {
                {
                    "identifier": "visible"
                    "default": "true"
                    "optional": "true"
                    "type": "simple"
                },
```

```
name → Application
description → Collection of functions
type → module
header → header
header.activities → header.activities
header.activities.newInstance → header.activities.newInstance
header.activities.newInstance.name → Open Instance
header.activities.newInstance.async → false
header.activities.newInstance.inputs → header.activities.newInstance.inputs
header.activities.newInstance.inputs.identifier → visible
header.activities.newInstance.inputs.default → true
header.activities.newInstance.inputs.optional → true
header.activities.newInstance.inputs.type → simple
header.activities.closeInstance → header.activities.closeInstance
header.activities.closeInstance.name → Close Instance
header.activities.closeInstance.async → false
header.activities.closeInstance.inputs → header.activities.closeInstance.inputs
header.activities.closeInstance.inputs.identifier → visible
header.activities.closeInstance.inputs.default → true
header.activities.closeInstance.inputs.optional → true
header.activities.closeInstance.inputs.type → simple
```

```
"name": "Application",
"description": "Collection of functions",
"type": "module",
"header": {
    "activities": {
        "newInstance": {
            "name": "New Instance",
            "async": true,
            "inputs": {
                {
                    "identifier": "visible"
                    "default": "false"
                    "optional": "true"
                    "type": "simple"
                },
            "closeCurrentInstance": {
                "name": "Close Instance",
                "async": false,
                "inputs": {
                {
                    "identifier": "visible"
                    "default": "true"
                    "type": "simple"
                },
```

```
name → Application
description → Collection of functions
type → module
header → header
header.activities → header.activities
header.activities.newInstance → header.activities.newInstance
header.activities.newInstance.name → New Instance
header.activities.newInstance.async → true
header.activities.newInstance.inputs → header.activities.newInstance.inputs
header.activities.newInstance.inputs.identifier → visible
header.activities.newInstance.inputs.default → false
header.activities.newInstance.inputs.optional → true
header.activities.newInstance.inputs.type → simple
header.activities.closeCurrentInstance → header.activities.closeCurrentInstance
header.activities.closeCurrentInstance.name → Close Instance
header.activities.closeCurrentInstance.async → false
header.activities.closeCurrentInstance.inputs → header.activities.closeCurrentInstance.inputs
header.activities.closeCurrentInstance.inputs.identifier → visible
header.activities.closeCurrentInstance.inputs.default → true
header.activities.closeCurrentInstance.inputs.type → simple
```

New — 710 header.activities.closeCurrentInstance → header.activities.closeCurrentInstance
header.activities.closeCurrentInstance.name → Close Instance
header.activities.closeCurrentInstance.async → false
header.activities.closeCurrentInstance.inputs → header.activities.closeCurrentInstance.inputs
header.activities.closeCurrentInstance.inputs.identifier → visible
header.activities.closeCurrentInstance.inputs.default → true
header.activities.closeCurrentInstance.inputs.type → simple

Updated — 720 header.activities.newInstance.name → New Instance
header.activities.newInstance.async → true
header.activities.newInstance.inputs.default → false

Removed — 730 header.activities.closeInstance → header.activities.closeInstance
header.activities.closeInstance.name → Close Instance
header.activities.closeInstance.async → false
header.activities.closeInstance.inputs →
header.activities.closeInstance.inputs
header.activities.closeInstance.inputs.identifier → visible
header.activities.closeInstance.inputs.default → true
header.activities.closeInstance.inputs.optional → true
header.activities.closeInstance.inputs.type → simple

*FIG. 7*

| Rule | | |
|---|---|---|
| Name | Key-Matching Attribute | Analysis Function |

*FIG. 8*

| Analysis Object | | | | | |
|---|---|---|---|---|---|
| Type | Status | Message | Warning | Importance | Score |

SYSTEM TO IDENTIFY AND CHARACTERIZE CODE CHANGES

BACKGROUND

Software applications, executed on-premise or in the cloud, have profoundly increased the efficiency of many tasks. Modern software development cycles result in the regular release of new versions of such software applications. These new versions may, for example, add features, address programming errors (i.e., bugs), or deprecate features. It therefore typically desirable for users to use the latest versions of software applications.

However, users may be hesitant to upgrade their software applications to the latest versions. Upgrading may involve system downtime as well as a temporary drop in efficiency (e.g., while the user learns to operate new features). Accordingly, a user may not wish to upgrade a software application to a new version if the expected benefits of such an upgrade (e.g., the additional functionalities provided by the new version) are minimal.

Users may also be concerned that upgrading a software application to a new version may break existing workflows that were created by, or which otherwise rely on, the software application. This concern is increasingly prevalent due to the integrated nature of modern distributed computing landscapes. For example, an upgrade which causes a change to an input parameter of a software application may disable a system which relies on another application to provide inputs to the upgraded software application.

Conventional techniques for addressing the above include application-specific algorithms for comparing two versions of a software application. Such algorithms identify differences in the various objects of the two versions of a particular software application. Then, for each changed object, an object-specific algorithm is applied to determine a functional description of the change to the object. Not only does such an approach require coding of distinct application- and object-specific comparison algorithms, but the algorithms must also be re-coded when new properties are added to an object. Moreover, to ensure quality, each algorithm should be unit-tested and maintained over a period of time. These techniques are therefore quite inefficient and unscalable.

Systems are desired which provide efficient characterization of changes in software application code.

DETAILED DESCRIPTION

The following description is provided to enable any person in the art to make and use the described embodiments. Various modifications, however, will remain readily-apparent to those in the art.

Some embodiments provide a generic algorithm for comparing a first version of program code with a second version and for incorporating custom rules to determine functional contexts corresponding to the results of the comparison. These functional contexts and, in some embodiments, a corresponding score, may then be presented to a user to assist the user in determining whether or not to upgrade from the first version to the second version. Since the generic algorithm remains the same regardless of the type of code being compared, applying the algorithm to a new or changed code type does not consume development resources with respect to the generic algorithm. Rather, only new rules may be needed to analyze changes to certain properties which are detected by the generic algorithm.

According to some embodiments, two code artifacts are initially compared. The code artifacts may comprise by-products of a build process as is known in the art. The code artifacts may include but are not limited to source code, compiled code, dependencies, binaries or resources. In order to compare the two code artifacts, embodiments generate a signature associated with each code artifact. As will be described below, a signature may comprise a set of key, value pairs corresponding to each line of code in an artifact.

The sets of key, value pairs of each artifact are compared to determine three subsets of key, value pairs: new; removed; and updated. Rules are then applied to the subsets of key, value pairs to determine a functional context and/or an incremental functional score of the corresponding code changes. In this regard, each key, value pair includes information regarding the code represented by the key value pair. As will be described in detail below, a rule may determine the functional context (and/or functional score) based on this information and on the subset to which the key, value pair belongs (i.e., new, removed or updated).

Figure 1:
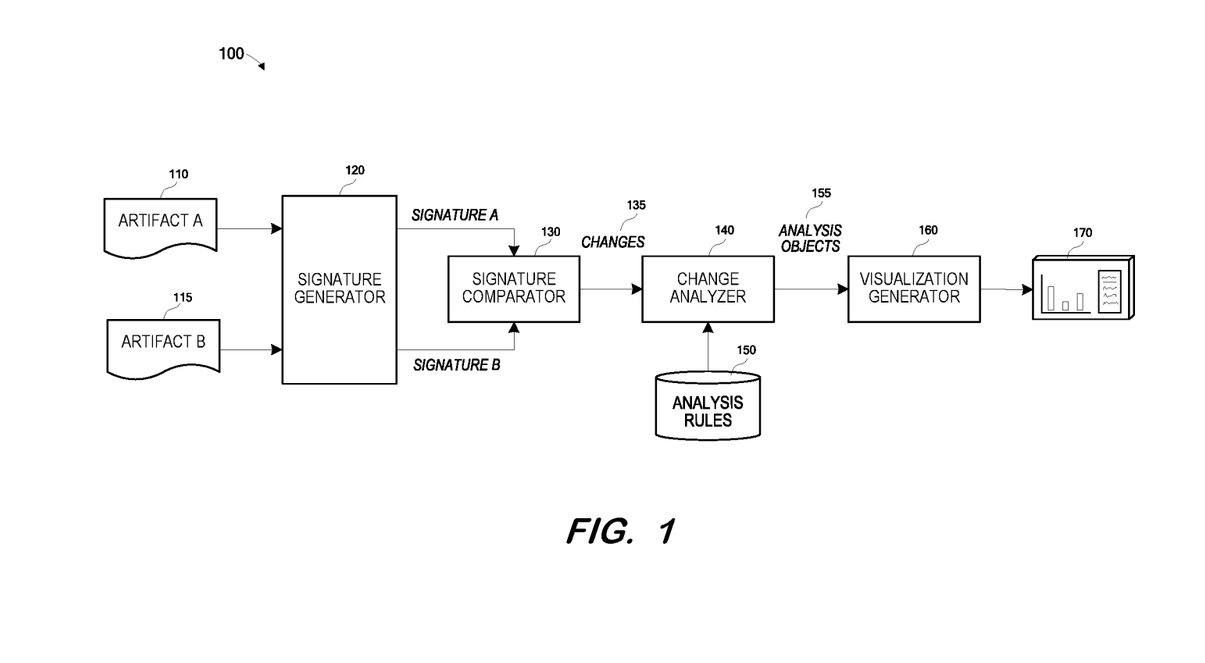
FIG. 1 is a block diagram of a system architecture according to some embodiments.

FIG. 1 is a block diagram of architecture 100 according to some embodiments. The illustrated components of architecture 100 may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more components of architecture 100 are implemented by a single computing device, and/or two or more components of architecture 100 are co-located. One or more components of architecture 100 may be implemented using cloud-based resources, and/or other systems which apportion computing resources elastically according to demand, need, price, and/or any other metric.

The components of architecture 100 may operate to identify and characterize differences between artifact A 110 and artifact B 115. Artifact A 110 and artifact B 115 each may comprise a portion of code conforming to any object-oriented programming language that is or becomes known. Such code may, for example, conform to JavaScript, C#, Java, or C++. Artifact A 110 and artifact B 115 may comprise different versions of a same software application, and each artifact may therefore include various modules data type enumerations, etc. For purposes of the following example, it will be assumed that artifact B is a more-recent version than artifact A.

Signature generator 120 generates Signature A based on artifact A 110 and Signature B based on artifact B 115. Each signature consists of a list of key, value pairs. Generally, the keys represent the structure of an artifact and the values represent property values associated with each artifact. An implementation for generating signatures will be described in detail below.

Signature comparer 130 compares Signature A with Signature B. The comparison results in a list which identifies those keys which exist in Signature B and do not exist in Signature A (i.e., "new" keys), those keys which exist in Signature A and do not exist in Signature B (i.e., "removed" keys), and those keys which exist in both Signature A and in Signature B but which are associated with different values therein (i.e., "updated" keys). The identified keys (and their associated values) are included in respective New, Added and Updated lists, denoted as changes 135 in FIG. 1.

Change analyzer 140 analyses changes 135 based on analysis rules 150. As will be described in detail below, each of analysis rules 150 includes information which is used to identify keys of changes 135 to which the analysis rule should be applied. Each of analysis rules 150 also includes a function which returns an analysis object 155 associated with the keys to which the analysis rule is applied. According to some embodiments, each analysis object 155 identifies a type of code entity that has been changed, whether the changed code entity is "new", "removed" or "updated", and a message which explains the change in user-understandable language.

In some embodiments, an analysis object 155 may also include a warning level property to indicate whether the change is compatible (e.g., expected), incompatible (e.g., unexpected) or possibly problematic (i.e., should be checked). An analysis object 155 may also or alternatively specify an importance level (e.g., very important, important, medium, low or very low) of the associated change.

An analysis object 155 associated with a change also includes an incremental score which may indicate the desirability of the change. In some embodiments, all incremental scores of all analysis objects 155 are summed to determine a functional score associated with the comparison between artifact A 110 and artifact B 115. The functional score may be limited to values between 0 and 100 in some embodiments. The functional score may indicate, to a user, a degree to which an upgrade from artifact A 110 to artifact B 115 is desirable.

Analysis objects 155 may be consumed by visualization generator 160 according to some embodiments. Visualization generator 160 may generate, for example, a Hypertext Markup Language visualization 170 of the changes as specified in analysis objects 155. An example of such a visualization is provided below.

Figure 2:
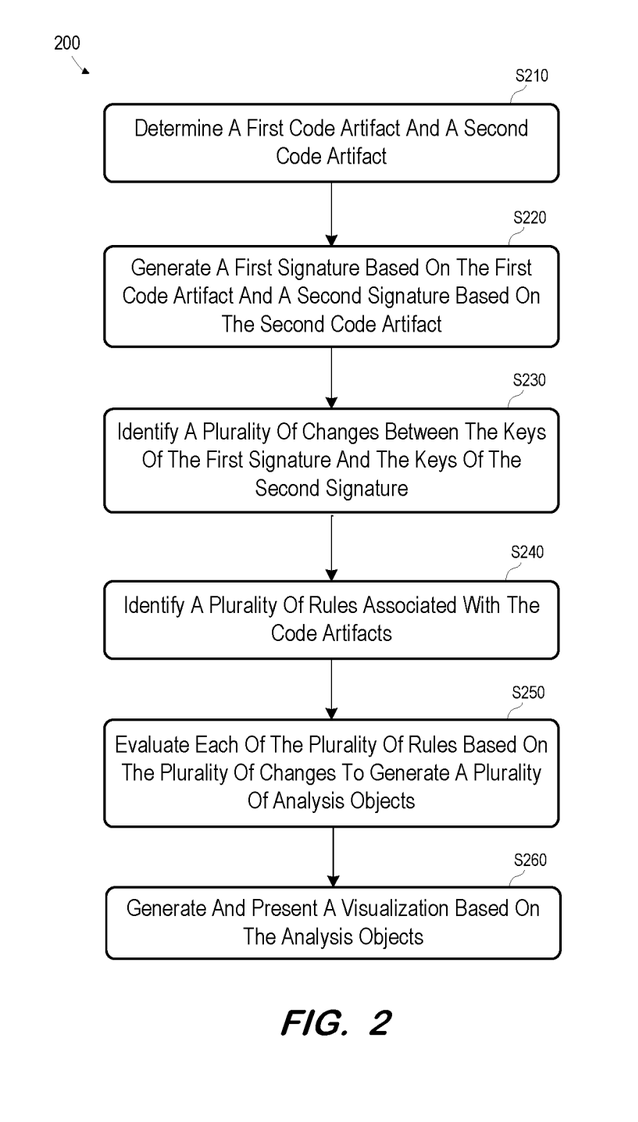
FIG. 2 is a flow diagram of a process to identify and characterize code changes according to some embodiments.

FIG. 2 is a flow diagram of a process to identify and characterize code changes according to some embodiments. Process 200 may be performed using any suitable combination of hardware and software. Software program code embodying this process may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 200 may be initiated in response to a user request for information regarding a proposed or potential update from a first software version to a second software version. In some embodiments, process 200 is executed as a sub-process of a larger process, such as but not limited to an automated process for generating a Software Development Kit based on source code. Initiation of process 200 is not limited to these examples.

Figure 3A:
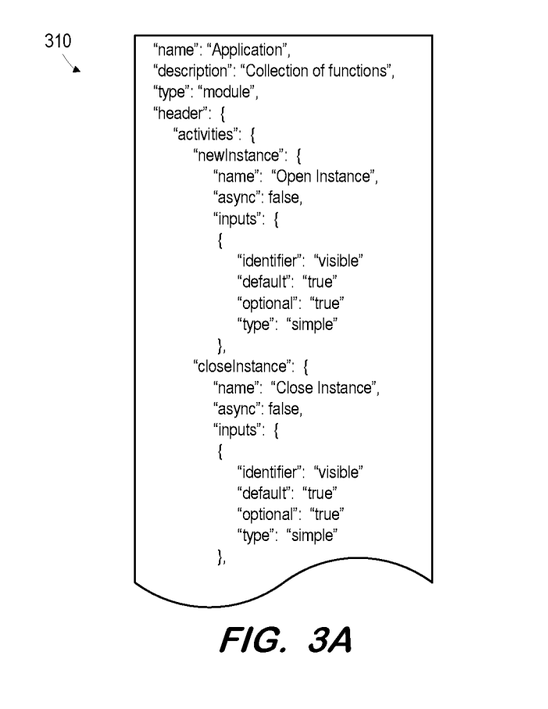
FIG. 3A illustrates a portion of program code according to some embodiments.
Figure 4A:
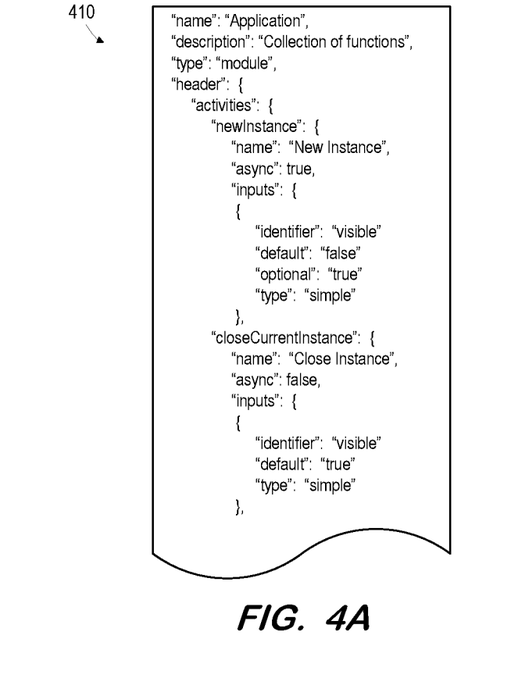
FIG. 4A illustrates a portion of program code according to some embodiments.

Initially, at S210, a first code artifact and a second code artifact are determined. As described above, each artifact may comprise a portion of code. For purposes of example, FIG. 3A illustrates a portion of first code artifact 310 and FIG. 4A illustrates a portion of second code artifact 410 determined at S210 according to some embodiments. Artifacts 310 and 410 are in JavaScript Object Notation (JSON) format, but embodiments are not limited thereto.

Artifact 310 includes a hierarchical structure of code entities, but again embodiments are not limited thereto. For clarity within the present description, entity names will be represented using italics. The root level of artifact 310 includes the entities name, description, type and header. The entity activities is located at a first sub-level of the entity header, and entities newInstance and closeInstance are located at a second sub-level of the entity header (and at a first sub-level of the entity activities). Each child entity of the entity activities is associated with the entities name, async and inputs, the latter of which is a parent entity of entities identifier, default, optional and type. The entity of each line of artifact 310 is either associated with a value (e.g., "description": "Collection of functions") or not (e.g., "header": {}). Entities associated with a value will be referred to as properties herein, while entities which are not associated with a value will be referred to as objects.

Artifact 410 differs from artifact 310 in several ways. The value of property name of object NewInstance has been changed from "Open Instance" to "New Instance", and the value of property async of object NewInstance has been changed from "false" to "true". Moreover, the value of property default of object inputs of object NewInstance has been changed from "true" to "false". The name of object closeInstance has also been changed to closeCurrentInstance. Finally, the property optional has been removed from the object inputs of the object closeInstance (now renamed closeCurrentInstance).

Figure 3B:
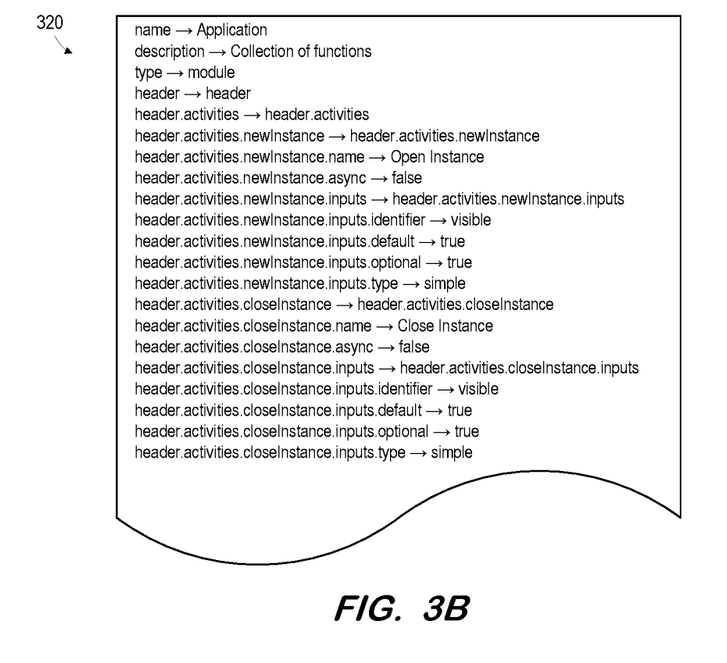
FIG. 3B illustrates key, value pairs generated based on the FIG. 3A program code according to some embodiments.
Figure 4B:
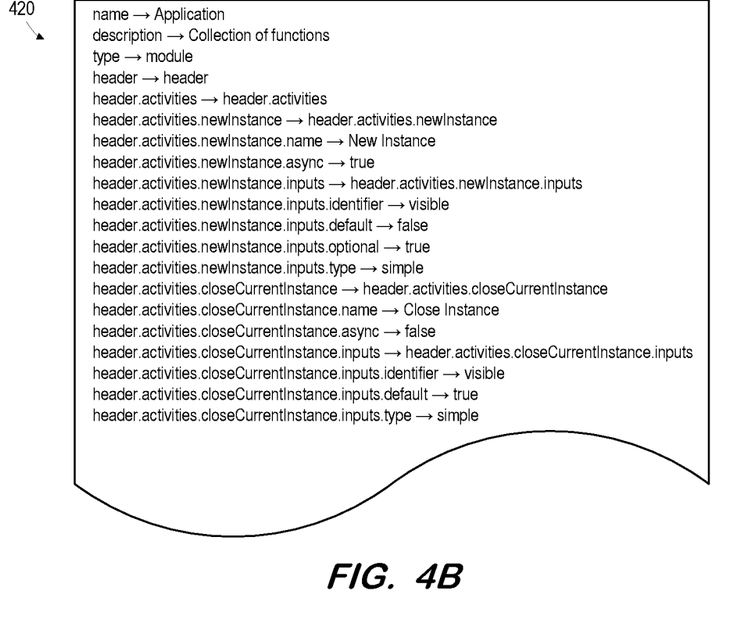
FIG. 4B illustrates key, value pairs generated based on the FIG. 4A program code according to some embodiments.

Next, at S220, a first signature is generated based on the first code artifact and a second signature is determined based on the second code artifact. Each signature comprises a list of key, value pairs. Continuing the present example, FIG. 3B illustrates first signature 320 generated at S220 based on first code artifact 310. Similarly, FIG. 4B illustrates first signature 420 generated at S220 based on second code artifact 410.

Figure 5:
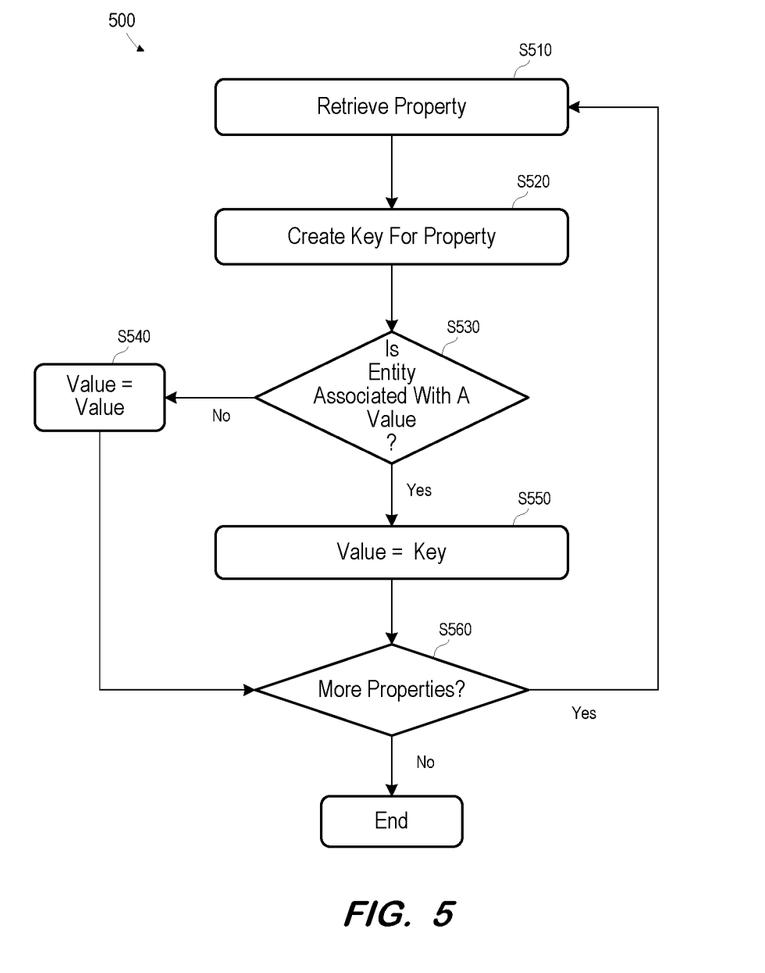
FIG. 5 is a flow diagram of a process to generate key, value pairs based on program code according to some embodiments.

Process 500 of FIG. 5 is executable to generate a signature based on a code artifact at S220 according to some embodiments. Implementations of S220 are not limited to processes which conform to process 500.

A first entity of a code artifact is retrieved at S510. Using artifact 310 as an example, the retrieved entity is: "name": "Application". Each line of artifacts 310 and 410 corresponds to a single entity. Accordingly, S510 includes retrieval of a single line of an artifact. In the case of artifacts in which entities are not arranged in such a structure, S510 includes parsing of the code artifact to retrieve a next entity.

A key is created for the entity at S520. The key should uniquely identify the entity within the artifact, in that no two keys created for the same artifact should be identical. For clarity, brackets ("[ ]") will be used in this text to denote keys, and key, value pairs will be represented using the convention using the convention <key>→<value>. Since the object name is at the root level of the artifact, the key created at S520 is [name].

Next, at S530, it is determined whether the retrieved entity is associated with a value. According to the current example, the entity name is associated with value "Application", so flow proceeds from S530 to S540. At S540, the value of the key, value pair for the entity is determined to be the value associated with the entity. Accordingly, using the convention <key>→<value>, the key, value pair determined for the entity "name": "Application" is name→Application. FIG. 3B illustrates signature 320 generated based on artifact 310 according to some embodiments, in which the first line of signature 320 shows the key, value pair generated based on the first entity of artifact 310.

Flow proceeds from S540 to S560 to determine whether any entities of the artifact remain to be processed. If so, flow returns to S510. In the current example, the second and third entities of artifact 310 are processed at S510-S540 as described above to generate corresponding key, value pairs: description→Collection of functions; and type→module. These key, value pairs are shown in the corresponding second and third lines of signature 320.

Flow again returns to S510 after processing the first, second and third entities of artifact 310. After retrieval of the next entity (i.e., "header": {) and generating the corresponding key [header], it is determined at S530 that no value is associated with the entity header. Flow therefore proceeds to S550, where the value corresponding to the key [header] is determined to be identical to the key, i.e., "header". Accordingly, the key, value pair determined for the fourth entity of artifact 310 is: header→header, as shown in signature 320.

In some embodiments, S550 assigns a NULL value or other predetermined identifier to the value of the key, value pair. Generally, embodiments may generate key, value pairs for entities which are not associated with values (i.e., objects) in any manner which allows the generated key, value pairs to be identified as such. Consequently, any downstream algorithms which perform subsequent processing on the signature will be able to distinguish key, value pairs which are associated with objects from key, value pairs which are associated with properties.

Flow then returns to S510 to retrieve entity: "activities": {. A key is created for the retrieved property at S520. According to some embodiments, since the retrieved entity is located within a parent object, the created key includes a prefix corresponding to the key of the parent object. In the present example, the parent object header is associated with key [header] and the key created at S520 for retrieved entity "activities": { is [header.activities]. Embodiments are not limited to the "." delimiter.

It is then determined at S530 that no value is associated with the object activities. Flow therefore proceeds to S550, where the value corresponding to the key [header.activities] is determined to be identical to the key, i.e., "header.activities". Accordingly, the key, value pair determined for the fifth entity of artifact 310 is: header.activities→header.activities, as shown in signature 320. The sixth entity of artifact 310 is similarly processed at S510, S520, S530 and S550 as described above to generate corresponding key, value pair header.activities.newInstance→header.activities.newInstance. This key, value pair is shown in the sixth line of signature 320.

Next, seventh entity: "name": "Open Instance", is retrieved at S510. As described above, the key created at S520 takes its parent object's key (i.e., [header.activities.newInstance]) as a prefix, resulting in key [header.activities.newInstance.name]. Since the entity type of the entity is a property, the value of the property is determined as the value of the key, value pair at S530. The resulting key, value pair is shown in signature 320 as header.activities.newInstance.name→Open Instance.

Process 500 continues as described above for each entity of artifact 310 until it is determined at S560 that no entity remain to be processed. At this point, signature 320 has been generated as shown in FIG. 3B. Notably, each key, value pair of signature 320 is unique from each other key, value pair of signature 320. Such uniqueness may facilitate identification of changed pairs during subsequent comparison with another signature.

Returning to FIG. 2, process 500 may also be applied to artifact 410 at S220 to generate signature 420 of FIG. 4A. Embodiments are not limited to the specific signature-generation steps described above. However, subsequent comparison of the generated signatures may be facilitated by applying the same signature-generation steps to both artifacts, regardless of the particulars of the signature-generation steps.

In this regard, a plurality of changes between the keys of the first signature and the keys of the second signature are identified at S230. The identification may identify those keys which exist in the second signature and do not exist in the first signature (i.e., "new" keys), those keys which exist in the first signature and do not exist in the second signature (i.e., "removed" keys), and those keys which exist in both signatures but which are associated with different values therein (i.e., "updated" keys).

Figure 6:
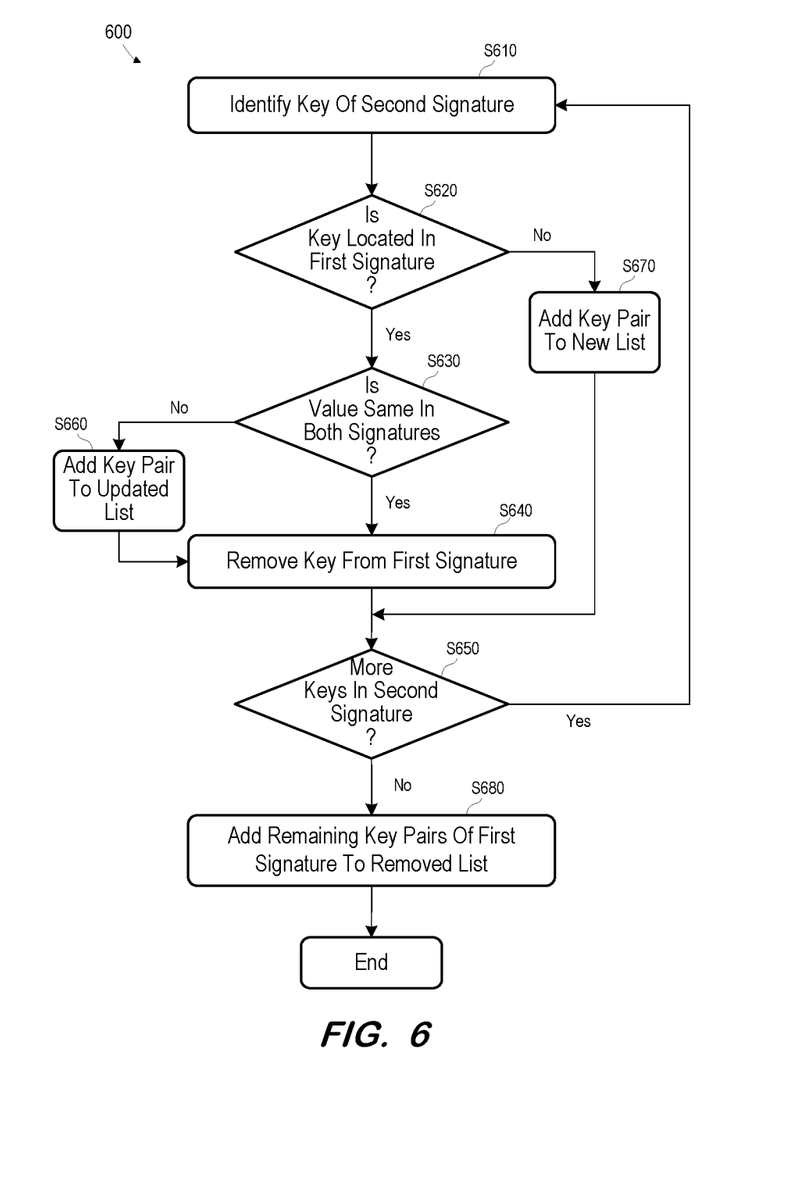
FIG. 6 is a flow diagram of a process to identify code changes based on key, value pairs according to some embodiments.

FIG. 6 is a flow diagram of process 600 to implement S230 according to some embodiments. A key of the second signature is identified at S610. At S620, the first signature is traversed to determine whether the identified key is identical to any key of the first signature. If so, as in the case of the first key of signatures 320 and 420, it is determined at S630 whether the values associated with the identical keys are also identical. If the values associated with the identical keys are also identical, again as in the case of the first key of signatures 320 and 420, the key, value pair is removed from the first signature at S640 and flow returns from S650 to S610 to identify a next key of the second signature.

If the keys are determined to be identical at S620 but the associated values are determined to not be identical at S630, as is the case of the seventh key, value pairs of signatures 320 and 420 (i.e., header.activities.newInstance.name→Open Instance, and header.activities.newInstance.name→New Instance), the key, value pair of the second signature is added to an Updated list and the key, value pair of the first signature is removed from the first signature at S640.

If it is determined at S620 that a key identified at S610 is not located in the first signature (e.g., all keys including "closeCurrentInstance"), the key, value pair of the second signature is added to a New list at S670. Flow continues to return from S650 to S610 to identify a next key of the second signature as long as there are key, value pairs of the second signature remaining to be processed.

Flow continues from S650 to S680 once it is determined that all of the key, value pairs of the second signature have been processed. Due to the removal of key, value pairs from the first signature at S640, any key, value pairs still remaining in the first signature at this point of process 600 must be associated with keys which no longer exist in the second signature. Accordingly, any key, value pairs which remain in the first signature are added to a Removed list at S680.

Figure 7:
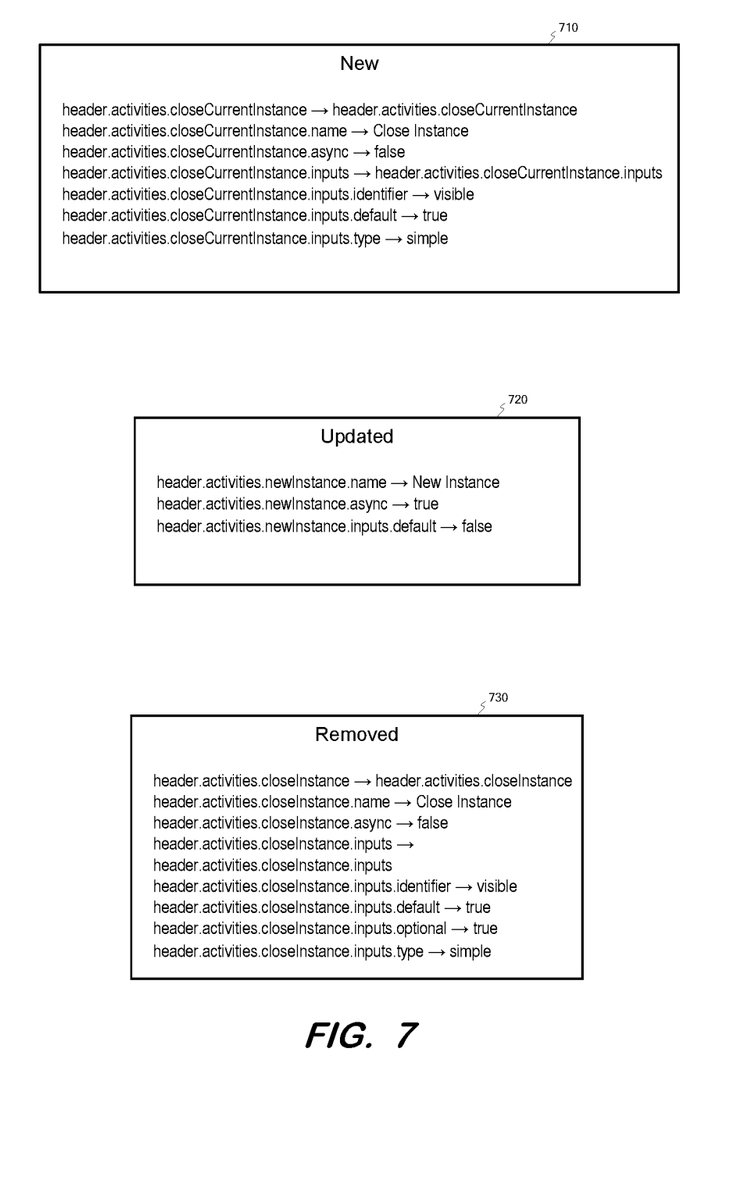
FIG. 7 illustrates lists of key, value pairs representing code changes according to some embodiments.

FIG. 7 illustrates New list 710, Updated list 720 and Removed list 730 generated based on signature 320 and signature 420 of the present example. Lists 710-730 may be used to analyze and provide functional contexts describing the differences between the first artifact and the second artifact. Notably, since lists 710-730 may be generated from any object-oriented artifacts using the generic algorithms described herein, a developer wishing to identify and characterize code changes for a particular application need only develop rules which are usable to identify keys of interest from within the lists and to determine functional consequences of the changes represented by the lists.

In this regard, and returning to process 200, a plurality of rules associated with the code artifacts are identified at S240. The plurality of rules may be associated with the application which is associated with the artifacts. Different applications may be associated with different analysis rules, but all analysis rules may operate upon lists of key, value pairs generated as described above. Analysis rules may be used to provide relevant information regarding the changes to a user.

Figure 8:
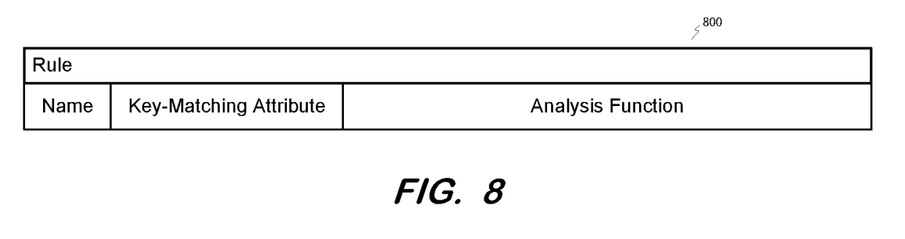
FIG. 8 is a representation of a rule schema according to some embodiments.

FIG. 8 illustrates schema 800 of analysis rules according to some embodiments. As shown, each rule includes a name of the rule, a key-matching attribute (e.g., a regex expression) which is used to identify key, value pairs to which the rule should be applied. For example, a rule may be associated with child objects of the activities object (i.e., activities). The key-matching attribute of such a rule may therefore be usable to parse lists 710-730 to find keys prefixed by "header.activities.".

Each rule according to schema 800 is also associated with an analysis function. The analysis function operates to process key, value pairs identified by the key-matching attribute and to generate one or more corresponding analysis objects. At S250, each of the plurality of rules is evaluated based on the plurality of changes to generate a plurality of analysis objects.

Generally, a first analysis rule may be selected at S250 and its key matching attribute used to identify a matching key, value pair from the lists of changes. The analysis function of the analysis rule is then applied to the key, value pair to generate an analysis object. The analysis function may consider other key, value pairs of the lists of changes.

In one example, an analysis rule may count the number of activities added by the second artifact. Accordingly, the rule is executed to identify and count all keys of the New list which represent activity objects (e.g., header.activities.<xxxxxx>). Similarly, an analysis rule may count the number of activities removed by the second artifact by parsing the keys of the Removed list. The latter analysis rule may generate a warning and/or incompatibility message for each removed activity.

In another example, an analysis rule is intended to count the number of new properties added by the second artifact. Accordingly, the analysis rule may identify all key, value pairs of the New list in which the value and the key are not identical. However, if a new activity has been added then all properties of the new activity will be represented in the New list. Accordingly, the analysis function of the analysis rule may operate to identify newly-added activities (e.g., as described in the example above) and to avoid counting the properties of those newly-added activities.

Another analysis rule may determine whether an input parameter has been removed or its identifier changed, for example if such a change would be undesirable. Such a rule may identify keys in the Updated or Removed lists which conform to header.activities.<xxxxxxx>.inputs or header.activities.<xxxxxxx>.identifier. The rule may generate corresponding messages, warnings, etc. depending on the identified keys.

According to some embodiments, an analysis rule may be used to identify certain changes to property values and generate corresponding messages. For example, it may be undesirable to change a type of an input or output parameter, unless the type is changed to "any". Accordingly, such a rule identifies any changes to the values of output parameter types which are not changes to the type "any", and generates a corresponding message, warnings, etc. In another example, the async property of an activity should not be changed from "true" to "false".

Some analysis rules may identify undesirable transitions in property values from one value to another. For example, a value of lifecycle status property should not transition from one value (e.g., active) to an earlier value (e.g., beta). Evaluation of such an analysis rule may require identifying a lifecycle status property associated with an updated value, and also determining the value associated with the lifecycle status property in the first artifact.

Figure 9:
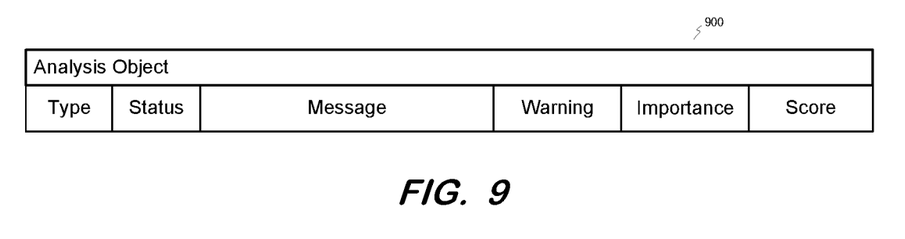
FIG. 9 is a representation of an analysis object schema according to some embodiments.

FIG. 9 illustrates schema 900 of an analysis object created by an analysis function of an analysis rule according to some embodiments. The Type field may designate the object or property to which the object pertains (e.g., activity), the Status field may indicate New, Updated or Removed, and the Message field may provide a functional context (e.g., "Activity <xxxxx> has been updated", "#activities have been removed", "Activity <xxxxx> has been changed from asynchronous to synchronous"). As shown, an analysis object may also include a Warning message (or level), an Importance indicator and/or a Score which may be populated by the analysis function which creates the object. The analysis objects generated at S250 may be grouped by Warning or Importance if desired.

An analysis function may determine a score associated with a change based on the type and status of the change. The scores may be hard-coded by the analysis function based on the importance to the type/status to the decision of whether to upgrade code versions. According to non-exhaustive examples, a change of type Module and status New may be associated with a score of 20, a change of type Activity and status New may be associated with a score of 5, a change of type Activity and status Updated may be associated with a score of 2 and a change of type Activity.Name and status New may be associated with a score of 0.01. Scores determined by an analysis function may be negative. For example, a change of type Activity and status Removed may be associated with a score of −10, since an upgrade which removes functionality may be undesirable.

A visualization is generated and presented at S260 based on the analysis objects. Advantageously, the generic schema of the analysis objects may facilitate the use of identical or similar visualization generators regardless of the type of application with which the artifacts are associated. An application-specific visualization generator may also be employed.

Figure 10:
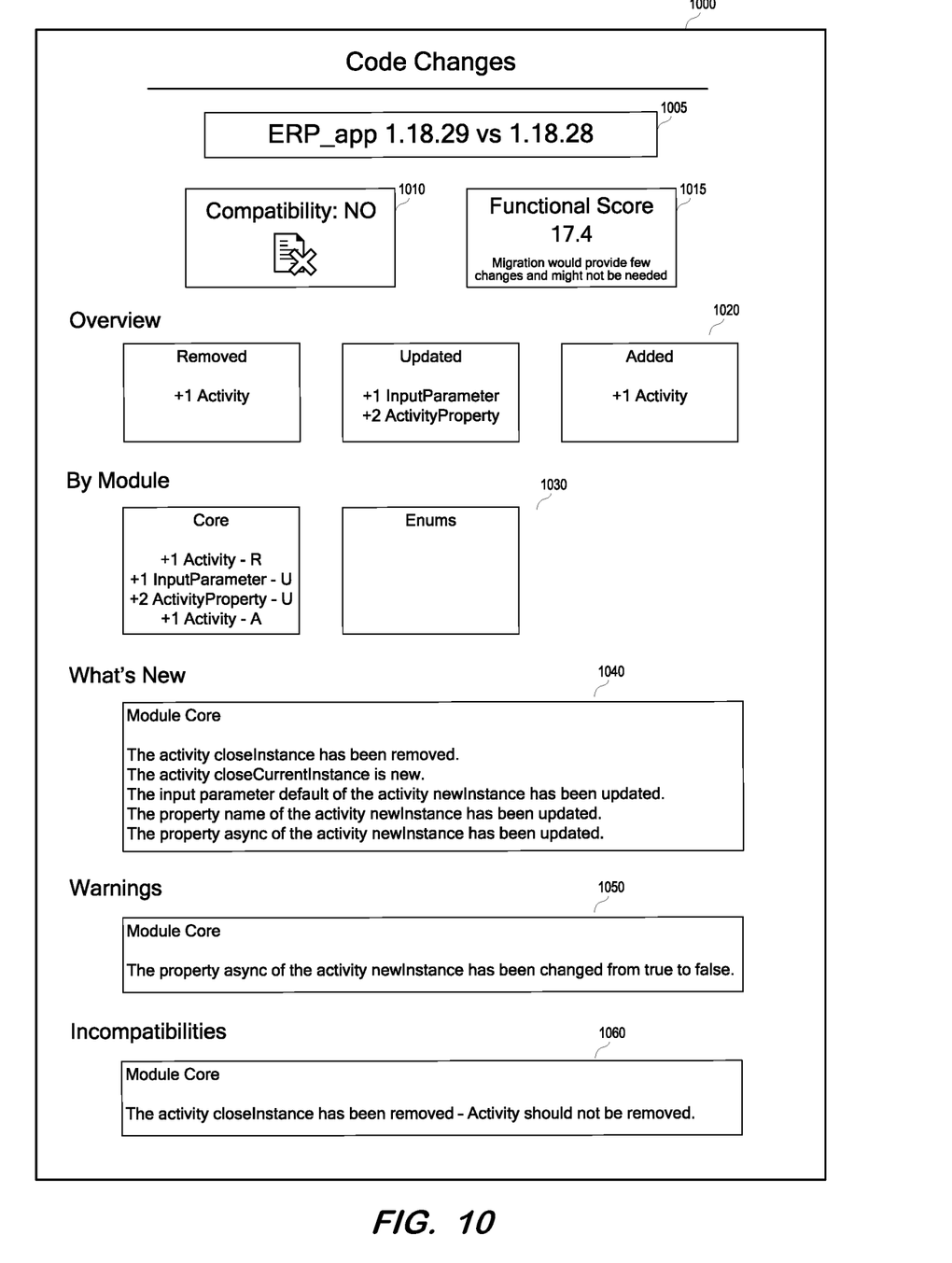
FIG. 10 is a view of a user interface presenting characterization of code changes according to some embodiments.

FIG. 10 is a view of visualization 1000 generated at S260 according to some embodiments. Visualization 1000 may comprise a Web page provided by a cloud-based server application for display by a Web browser executing on a local system. Visualization 1000 may also comprise a user interface of a standalone local application. Embodiments are not limited to the format or content of visualization 1000.

Visualization 1000 includes area 1005 identifying the code artifacts under comparison. Visualization 1000 provides a visualization of information encapsulated by analysis objects generated as described above. This information may be parsed, aggregated, or otherwise used to provide any suitable visual display thereof. For example, any suitable algorithms may be employed to determine and present compatibility flag 1010 based on the generated analysis objects. In one implementation, compatibility flag 1010 indicates "No" if any generated analysis object indicates an incompatible change.

Functional score area 1015 presents a functional score associated with an upgrade from version 1.18.28 to version 1.18.29. The functional score may be determined based on analysis objects generated as described above. According to some embodiments, the functional score is determined by summing the scores associated with each generated analysis object. The functional score may be limited to a range between 0 and 100 so as to improve its interpretability. In this regard, some embodiments may provide additional text in functional score area 1015 which is based on the value of the functional score. For example, functional scores less than 30 may be associated with text indicating that an upgrade is not particularly desirable (as shown in FIG. 10), due to minimal additional functionality provided by the newer code version. Functional scores between 30 and 70 may be associated with text indicating that an upgrade might be beneficial, while functional scores above 70 may be labeled with text indicating that the upgrade would provide many new features and is recommended.

Overview area 1020 provides a quick summary of the Removed, Updated and Added changes. The contents of overview area 1020 may be aggregated based on the Type and Status fields of the analysis objects. As described above, properties of an added activity may be ignored in the Added region of area 1020 for clarity.

By Module area 1030 presents a count of changes per object type per module of the subject application. The present example assumes that changes are only present in a core module. Any number of modules may be analyzed according to some embodiments.

What's New area 1040 may include messages associated with the generated analysis objects. The messages may be intended to facilitate understanding of the functional context of the changes. Similarly, Warnings area 1050 includes any warnings associated with the analysis objects and Incompatibilities area 1060 includes any incompatibilities associated with the analysis objects. These warnings and incompatibilities are generated by the analysis functions of the analysis rules as described above.

Figure 11:
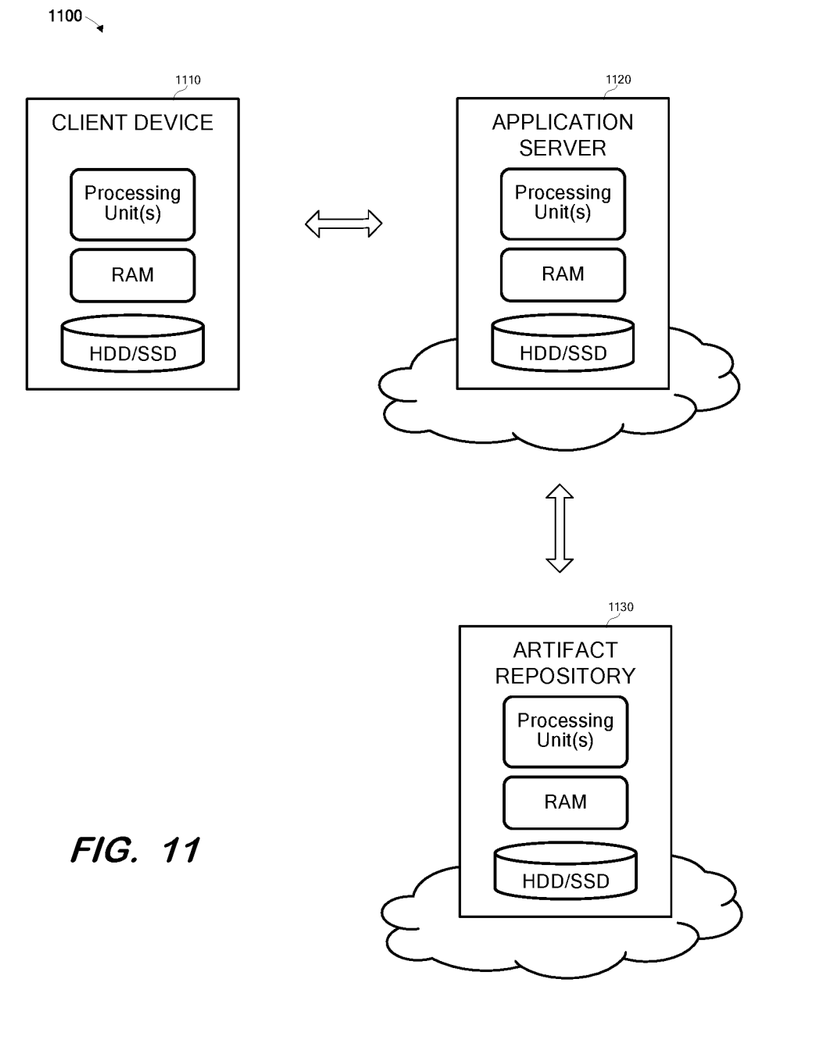
FIG. 11 is a block diagram of computing systems implementing a system architecture according to some embodiments.

FIG. 11 is a block diagram of cloud-based system 1100 according to some embodiments. In this regard, application server 1120 and artifact repository 1130 may comprise cloud-based compute resources, such as virtual machines, allocated by a public cloud provider providing self-service and immediate provisioning, autoscaling, security, compliance and identity management features.

Client device 1110 may interact with user interfaces of a service or application executing on application server 1120, for example via a Web browser executing on client device 1110. These user interfaces may provide the ability to select an alternate version of the service or application. Selection of an alternate version may initiate a change identification and characterization process as described herein. The process may be conducted by artifact repository 1130 which stores artifacts of the current version and the alternate version and/or application server 1120. Execution of the process may result in presentation of a visualization characterizing changes between the current version and the alternate version as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
  a memory storing processor-executable program code; and
  a processing unit to execute the processor-executable program code to cause the system to:
  determine a first code artifact of a first application and a second code artifact of the first application;

generate a first plurality of key, value pairs by, for each of
   a plurality of lines of code of the first code artifact:
   determination of an entity corresponding to a line of
      code of the first code artifact;
   determination of any parent entities of the entity, each
      parent entity corresponding to a respective line of
      code of the first code artifact;
   determination of a key identifying the entity and all
      determined parent entities; and
   determination of a value corresponding to the key,
      where the line of code of the first code artifact
      associates the entity with the value;
generate a second plurality of key, value pairs by, for each
   of a plurality of lines of code of the second code
   artifact:
   determination of a second entity corresponding to a line
      of code of the second code artifact;
   determination of any parent entities of the second
      entity, each parent entity of the second entity corresponding to a respective line of code of the second
      code artifact;
   determination of a second key identifying the second
      entity and all determined parent entities of the second entity; and
   determination of a second value corresponding to the
      second key, where the line of code of the second
      code artifact associates the second entity with the
      second value;
identify a plurality of changes between the first plurality
   of key, value pairs and the second plurality of key,
   value pairs, the plurality of changes including a third
   plurality of key, value pairs;
determine a plurality of rules associated with the first
   application;
for each of the plurality of rules:
   determine whether the third plurality of key, value pairs
      includes at least one key, value pair associated with
      the rule; and
   if the third plurality of key, value pairs includes at least
      one key, value pair associated with the rule, apply the
      rule to each of the at least one key, value pairs to
      determine an analysis output associated with each of
      the at least one key, value pairs;
generate a visualization based on the analysis outputs; and
deploy compatible ones of the plurality of changes to
   update a version of the first application associated with
   the first artifact.

2. The system according to claim 1, wherein the third plurality of key, value pairs comprises a fourth plurality of key, value pairs associated with added keys, a fifth plurality of key, value pairs associated with removed keys, and a sixth plurality of key, value pairs associated with updated keys.

3. The system according to claim 2, wherein generation of the visualization comprises:
   determination of a first number of added keys, a second number of removed keys, and a third number of updated keys; and
   generation of the visualization including the first number, the second number and the third number.

4. The system according to claim 3, wherein generation of the visualization comprises:
   determination of a score associated with each of the added keys, removed keys, and updated keys;
   determination of a functional score based on the determined scores; and
   generation of the visualization including the functional score.

5. The system according to claim 1, wherein a first analysis output associated with a first key, value pair comprises a text message that an object associated with the key of the first key, value pair in the first artifact is not present in the second artifact,
   wherein a second analysis output associated with a second key, value pair comprises a second text message that a value of a property associated with the key of the second key, value pair in the first artifact is changed in the second artifact, and
   wherein the visualization includes the text message and the second text message.

6. The system according to claim 1, wherein generation of the first plurality of key, value pairs comprises:
   generation of a fourth plurality of key, value pairs by, for each of a second plurality of lines of code of the first code artifact:
      determination of a third entity corresponding to a line of code of the second plurality of lines of code of the first code artifact;
      determination of any parent entities of the third entity, each parent entity of the third entity corresponding to a respective line of code of the first code artifact;
      determination of a third key identifying the third entity and all determined parent entities of the third entity; and
      determination of a third value corresponding to the third key, the third value indicating that the line of code of the second plurality of lines of code of the first code artifact does not associate the entity with a value.

7. The system according to claim 6, wherein the determined third value is equal to the key.

8. A computer-implemented method, comprising:
   determining a first code artifact and a second code artifact;
   generating a first plurality of key, value pairs by, for each of a plurality of lines of code of the first code artifact:
      determining an entity corresponding to a line of code of the first code artifact;
      determining any parent entities of the entity, each parent entity corresponding to a respective line of code of the first code artifact;
      determining a key identifying the entity and all determined parent entities; and
      determining a value corresponding to the key, where the line of code of the first code artifact associates the entity with the value;
   generating a second plurality of key, value pairs by, for each of a plurality of lines of code of the second code artifact:
      determining a second entity corresponding to a line of code of the second code artifact;
      determining any parent entities of the second entity, each parent entity of the second entity corresponding to a respective line of code of the second code artifact;
      determining a second key identifying the second entity and all determined parent entities of the second entity; and
      determining a second value corresponding to the second key, where the line of code of the second code artifact associates the second entity with the second value;
   identifying a plurality of changes between the first plurality of key, value pairs and the second plurality of key, value pairs, the plurality of changes represented by a third plurality of key, value pairs;
for each of a plurality of rules:
 determining whether the third plurality of key, value pairs includes at least one key, value pair associated with the rule; and
 if the third plurality of key, value pairs includes at least one key, value pair associated with the rule, applying the rule to each of the at least one key, value pairs to determine an analysis output associated with each of the at least one key, value pairs;
generating a visualization based on the analysis outputs; and
deploying compatible ones of the plurality of changes to update a version of the first application associated with the first artifact.

9. The method according to claim 8, wherein the third plurality of key, value pairs comprises a fourth plurality of key, value pairs associated with added keys, a fifth plurality of key, value pairs associated with removed keys, and a sixth plurality of key, value pairs associated with updated keys.

10. The method according to claim 9, wherein generating the visualization comprises:
 determining a first number of added keys, a second number of removed keys, and a third number of updated keys; and
 generating the visualization including the first number, the second number and the third number.

11. The method according to claim 10, wherein generating the visualization comprises:
 determining a score associated with each of the added keys, removed keys, and updated keys;
 determining a functional score based on the determined scores; and
 generating the visualization including the functional score.

12. The method according to claim 8, wherein a first analysis output associated with a first key, value pair comprises a text message that an object associated with the key of the first key, value pair in the first artifact is not present in the second artifact,
 wherein a second analysis output associated with a second key, value pair comprises a second text message that a value of a property associated with the key of the second key, value pair in the first artifact is changed in the second artifact, and
 wherein the visualization includes the text message and the second text message.

13. The method according to claim 8, wherein generating the first plurality of key, value pairs comprises:
 generating a fourth plurality of key, value pairs by, for each of a second plurality of lines of code of the first code artifact:
  determining a third entity corresponding to a line of code of the second plurality of lines of code of the first code artifact;
  determining any parent entities of the third entity, each parent entity of the third entity corresponding to a respective line of code of the first code artifact;
  determining a third key identifying the third entity and all determined parent entities of the third entity; and
  determining a third value corresponding to the third key, the third value indicating that the line of code of the second plurality of lines of code of the first code artifact does not associate the entity with a value.

14. The method according to claim 13, wherein the determined third value is equal to the key.

15. A non-transitory computer-readable medium storing program code executable by a processing unit of a computing system causes the computing system to:
 determine a first code artifact of a first application and a second code artifact of the first application;
 generate a first plurality of key, value pairs by, for each of a plurality of lines of code of the first code artifact:
  determination of an entity corresponding to a line of code of the first code artifact;
  determination of any parent entities of the entity, each parent entity corresponding to a respective line of code of the first code artifact;
 determination of a key identifying the entity and all determined parent entities; and
  determination of a value corresponding to the key, where the line of code of the first code artifact associates the entity with the value;
 generate a second plurality of key, value pairs by, for each of a plurality of lines of code of the second code artifact:
  determination of a second entity corresponding to a line of code of the second code artifact;
  determination of any parent entities of the second entity, each parent entity of the second entity corresponding to a respective line of code of the second code artifact;
  determination of a second key identifying the second entity and all determined parent entities of the second entity; and
  determination of a second value corresponding to the second key, where the line of code of the second code artifact associates the second entity with the second value;
 identify a plurality of changes between the first plurality of key, value pairs and the second plurality of key, value pairs, the plurality of changes including a third plurality of key, value pairs;
 determine a plurality of rules associated with the first application;
 for each of the plurality of rules:
  determine whether the third plurality of key, value pairs includes at least one key, value pair associated with the rule; and
  if the third plurality of key, value pairs includes at least one key, value pair associated with the rule, apply the rule to each of the at least one key, value pairs to determine an analysis output associated with each of the at least one key, value pairs; and
 generate a visualization based on the analysis outputs; and
 deploy compatible ones of the plurality of changes to update a version of the first application associated with the first artifact.

16. The non-transitory computer-readable medium according to claim 15, wherein a first analysis output associated with a first key, value pair comprises a text message that an object associated with the key of the first key, value pair in the first artifact is not present in the second artifact,
 wherein a second analysis output associated with a second key, value pair comprises a second text message that a value of a property associated with the key of the second key, value pair in the first artifact is changed in the second artifact, and
 wherein the visualization includes the text message and the second text message.

17. The non-transitory computer-readable medium according to claim 15, wherein generation of the first plurality of key, value pairs comprises:

generation of a fourth plurality of key, value pairs by, for each of a second plurality of lines of code of the first code artifact:
  determination of a third entity corresponding to a line of code of the second plurality of lines of code of the first code artifact;
  determination of any parent entities of the third entity, each parent entity of the third entity corresponding to a respective line of code of the first code artifact;
  determination of a third key identifying the third entity and all determined parent entities of the third entity; and
  determination of a third value corresponding to the third key, the third value indicating that the line of code of the second plurality of lines of code of the first code artifact does not associate the entity with a value.

18. The non-transitory computer-readable medium according to claim 17, wherein the determined third value is equal to the key.

19. The non-transitory computer-readable medium according to claim 15, wherein the third plurality of key, value pairs comprises a fourth plurality of key, value pairs associated with added keys, a fifth plurality of key, value pairs associated with removed keys, and a sixth plurality of key, value pairs associated with updated keys, and
  wherein generation of the visualization comprises:
    determination of a first number of added keys, a second number of removed keys, and a third number of updated keys; and
    generation of the visualization including the first number, the second number and the third number.

20. The non-transitory computer-readable medium according to claim 19, wherein generation of the visualization comprises:
  determining a score associated with each of the added keys, removed keys, and updated keys;
  determination of a functional score based on the determined scores; and
  generation of the visualization including the functional score.

* * * * *